US011567024B2

(12) United States Patent
Deshpande et al.

(10) Patent No.: US 11,567,024 B2
(45) Date of Patent: Jan. 31, 2023

(54) SYSTEM AND METHOD FOR DETECTION OF CONCENTRATION OF MICRO AND NANO PARTICLES IN A FLUID ENVIRONMENT

(71) Applicant: Tata Consultancy Services Limited, Mumbai (IN)

(72) Inventors: Parijat Dilip Deshpande, Pune (IN); Jayita Dutta, Pune (IN); Beena Rai, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 480 days.

(21) Appl. No.: 16/713,596

(22) Filed: Dec. 13, 2019

(65) Prior Publication Data

US 2020/0264117 A1    Aug. 20, 2020

(30) Foreign Application Priority Data

Dec. 14, 2018 (IN) .............................. 201821047466

(51) Int. Cl.
*G01N 27/12* (2006.01)
*G01N 35/00* (2006.01)
(Continued)

(52) U.S. Cl.
CPC ..... *G01N 27/127* (2013.01); *G01N 35/00871* (2013.01); *G01N 15/06* (2013.01);
(Continued)

(58) Field of Classification Search
CPC ........... G01N 27/127; G01N 35/00871; G01N 2035/00881; G01N 2291/105; G01N 15/06; G01N 29/02; G01N 29/222; G01N 29/348; G01N 29/4418; G01N 29/4481; G01N 2291/02416
See application file for complete search history.

(56) References Cited

U.S. PATENT DOCUMENTS

5,969,237 A * 10/1999 Jones ................. G01N 33/2823
 73/64.42
7,052,854 B2    5/2006 Melker et al.
(Continued)

*Primary Examiner* — Alexander A Mercado
*Assistant Examiner* — John M Royston
(74) *Attorney, Agent, or Firm* — Finnegan, Henderson, Farabow, Garrett & Dunner LLP (57) ABSTRACT

This disclosure relates generally to detection of concentration of micro and nano particles in a fluid environment. An acoustic transmitter array is selective coated with polymer and receiver array is deployed at a random location in a conduit. The acoustic transmitter array on the conduit is insonified at a predetermined frequency to obtain a plurality of reflected signals. A plurality of key features pertinent to the conduit are extracted from the plurality of reflected signals to obtain a plurality of acoustic signals. A correlation model is configured by inputting, at least one feature associated with the pre-processed acoustic signals. A known concentrations of nano and micro particles are trained with an artificial neural network algorithm and calibrated with ground truth data. The location of the transmitter array and receiver array and the correlation model are finalized for detecting concentration of the particular micro and nano particles in the fluid environment.

12 Claims, 7 Drawing Sheets

(51) Int. Cl.
*G01N 15/06* (2006.01)
*G01N 29/44* (2006.01)
*G01N 29/22* (2006.01)

(52) U.S. Cl.
CPC ....... *G01N 29/222* (2013.01); *G01N 29/4418* (2013.01); *G01N 29/4481* (2013.01); *G01N 2035/00881* (2013.01)

(56) References Cited

U.S. PATENT DOCUMENTS

| | | |
|---|---|---|
| 9,080,942 B2 | 7/2015 | Zhong et al. |
| 2007/0116607 A1 | 5/2007 | Wang et al. |
| 2007/0175280 A1* | 8/2007 | Johansen ............. G01N 29/032 73/599 |
| 2007/0224128 A1 | 9/2007 | Dennis et al. |
| 2013/0104657 A1* | 5/2013 | Lin ........................ G01N 15/06 73/602 |

* cited by examiner

FIG. 4A configuring, a correlation model based on at least one of:

(a) pre-processing, the plurality of acoustic signals to obtain a preprocessed signals by removing one or more noise or outliers;

(b) analyzing, the pre-processed acoustic signals to obtain at least one feature associated with the pre-processed acoustic signals; and     (c) inputting, the at least one feature associated with the pre-processed acoustic signals are fed into an artificial neural network (ANN) to configure the correlation model based on at least one of: (i) a supervised learning, or (ii) unsupervised learning and (iii) combination thereof 410 training, the correlation model with a calibrated ground truth data to obtain concentration of the micro and the nano particles 412

SYSTEM AND METHOD FOR DETECTION OF CONCENTRATION OF MICRO AND NANO PARTICLES IN A FLUID ENVIRONMENT

PRIORITY CLAIM

This U.S. patent application claims priority under 35 U.S.C. § 119 to: India Application No. 201821047466, filed on Dec. 14, 2018. The entire contents of the aforementioned application are incorporated herein by reference.

TECHNICAL FIELD

This disclosure relates generally to sensing system, and, more particularly, to system and method for detection of concentration of micro and nano particles in a fluid environment by an acoustic sensor array coated with selective polymers.

BACKGROUND

Detection and measurement of nano and micro particles in a moving liquid requires use of extremely complex and expensive equipment such as spectrometers. These process require large and expensive equipment and elaborate measurement protocols and are not in-situ for most environments e.g. pipelines carrying crude oil. Spectrometry based systems which require obtrusive and very expensive installations for sample collection. Spectrometer based, high performance liquid chromatographic (HPLC) techniques, Raman Spectroscopy systems are expensive and not suitable for in-situ measurements. They are rarely installed in-situ in harsh environments.

Calibration and extensive set-up is required prior to using such systems e.g. Chromatography based (HPLC) depending on the location and complexity of the pipeline/environments. Sample collection and post processing make such systems non-viable deployment in environments with real time detection requirements such as feedback control etc. The measurements from existing sensors require a prolonged process and may not be useful for controlling purposes (no feedback loop). In corrosive and harsh environments several sensors may not perform and get damaged. Optic based systems require significant computation and do not perform well in real time applications. The environment may not be accessible (e.g. under sea crude oil pipeline) for such elaborate optical/hyper spectral systems.

SUMMARY

Embodiments of the present disclosure present technological improvements as solutions to one or more of the above-mentioned technical problems recognized by the inventors in conventional systems. For example, in one aspect, a processor implemented method of detecting and estimating concentration of micro and nano particles in a fluid environment is provided. The processor implemented method includes at least one of: deploying, an acoustic transmitter and receiver array at a first location in a conduit; applying, a selective coating of polymer to a transmitting face of the acoustic transmitter array based on an intended particle to be measured; insonifying, the acoustic transmitter array on the conduit at a predetermined frequency from the first location to obtain a plurality of reflected signals; extracting, a plurality of key features pertinent to the conduit from the plurality of reflected signals and by marking a plurality of locations to obtain an plurality of acoustic signals; configuring, a correlation model based on at least one of: (a) pre-processing, the plurality of acoustic signals to obtain a preprocessed signals by removing one or more noise or outliers; (b) analyzing, the pre-processed acoustic signals to obtain at least one feature associated with the pre-processed acoustic signals; and (c) inputting, the at least one feature associated with the pre-processed acoustic signals are fed into an artificial neural network (ANN) to configure the correlation model based on at least one of: (i) a supervised learning, or (ii) unsupervised learning and (iii) combination thereof; and training, the correlation model with a calibrated ground truth data to obtain concentration of the micro and the nano particles. In an embodiment, the intended particle corresponds to the micro and the nano particles.

The processor implemented method further include determining, an acoustic map of the conduit based on the plurality of key features and a minimum number of recordings are established. In an embodiment, the at least one feature associated with the pre-processed acoustic signals may be to distinguish effect on the plurality of reflected signals due to effect of at least one particle adsorbed on the face of the transmitter array. In an embodiment, the at least one key features may be extracted from at least one of: (i) a time-domain, (ii) a frequency domain, and (iii) wavelets. In an embodiment, the supervised learning may correspond to at least one of a classification and regression tree (CART), a support vector machine (SVM). In an embodiment, the unsupervised learning may correspond to at least one of k-means, mixture models, Hidden Markov Models (HMMs).

In another aspect, there is provided a system to detect and estimate concentration of micro and nano particles in a fluid environment. The system comprises a memory storing instructions; one or more communication interfaces; and one or more hardware processors coupled to the memory via the one or more communication interfaces, wherein the one or more hardware processors are configured by the instructions to: deploy, an acoustic transmitter and receiver array at a first location in a conduit; apply, a selective coating of polymer to a transmitting face of the acoustic transmitter array based on an intended particle to be measured; insonify, the acoustic transmitter array on the conduit at a predetermined frequency from the first location to obtain a plurality of reflected signals; extract, a plurality of key features pertinent to the conduit from the plurality of reflected signals and by marking a plurality of locations to obtain an plurality of acoustic signals; configure, a correlation model based on at least one of: (a) pre-process, the plurality of acoustic signals to obtain a preprocessed signals by removing one or more noise or outliers; (b) analyze, the pre-processed acoustic signals to obtain at least one feature associated with the pre-processed acoustic signals; and (c) input, the at least one feature associated with the pre-processed acoustic signals are fed into an artificial neural network (ANN) to configure the correlation model based on at least one of: (i) a supervised learning, or (ii) unsupervised learning and (iii) combination thereof; and train, the correlation model with a calibrated ground truth data to obtain concentration of the micro and the nano particles. In an embodiment, the intended particle corresponds to the micro and the nano particles.

In an embodiment, the one or more hardware processors may be configured by the instructions to determine, an acoustic map of the conduit based on the plurality of key features and a minimum number of recordings are established. In an embodiment, the at least one feature associated with the pre-processed acoustic signals may be to distinguish effect on the plurality of reflected signals due to effect of at least one particle adsorbed on the face of the transmitter array. In an embodiment, the at least one key features may be extracted from at least one of: (i) a time-domain, (ii) a frequency domain, and (iii) wavelets. In an embodiment, the supervised learning may correspond to at least one of a classification and regression tree (CART), a support vector machine (SVM). In an embodiment, the unsupervised learning may correspond to at least one of k-means, mixture models, Hidden Markov Models (HMMs).

In yet another aspect, there are provided one or more non-transitory machine readable information storage mediums comprising one or more instructions which when executed by one or more hardware processors causes at least one of: deploying, an acoustic transmitter and receiver array at a first location in a conduit; applying, a selective coating of polymer to a transmitting face of the acoustic transmitter array based on an intended particle to be measured; insonifying, the acoustic transmitter array on the conduit at a predetermined frequency from the first location to obtain a plurality of reflected signals; extracting, a plurality of key features pertinent to the conduit from the plurality of reflected signals and by marking a plurality of locations to obtain a plurality of acoustic signals; configuring, a correlation model based on at least one of: (a) pre-processing, the plurality of acoustic signals to obtain a preprocessed signals by removing one or more noise or outliers; (b) analyzing, the pre-processed acoustic signals to obtain at least one feature associated with the pre-processed acoustic signals; and (c) inputting, the at least one feature associated with the pre-processed acoustic signals are fed into an artificial neural network (ANN) to configure the correlation model based on at least one of: (i) a supervised learning, or (ii) unsupervised learning and (iii) combination thereof; and training, the correlation model with a calibrated ground truth data to obtain concentration of the micro and the nano particles. In an embodiment, the intended particle corresponds to the micro and the nano particles.

In an embodiment, the one or more hardware processors may be configured by the instructions for determining, an acoustic map of the conduit based on the plurality of key features and a minimum number of recordings are established. In an embodiment, the at least one feature associated with the pre-processed acoustic signals may be to distinguish effect on the plurality of reflected signals due to effect of at least one particle adsorbed on the face of the transmitter array. In an embodiment, the at least one key features may be extracted from at least one of: (i) a time-domain, (ii) a frequency domain, and (iii) wavelets. In an embodiment, the supervised learning may correspond to at least one of a classification and regression tree (CART), a support vector machine (SVM). In an embodiment, the unsupervised learning may correspond to at least one of k-means, mixture models, Hidden Markov Models (HMMs).

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Embodiments herein provides a system and method for detection and measurement of concentration of micro and nano particles in a stationary and flowing fluid environment (e.g. micelles in a crude oil pipeline) by an acoustic sensor array coated with selective polymers. Direct detection using a sweep of high frequency acoustic waves by assessing influence of adsorbed particles on a plurality of acoustic transducers (e.g., face of transducers). Detecting effect of particles by selectively adsorbing them to the plurality of acoustic transducers and assessing associated impacts as a function of particle concentration and their effect on resonance frequency of the plurality of acoustic transducers. The system is configured to analyze features at various locations to prepare an acoustic map of entire environment and optimize number of locations for rapid assessments.

The embodiments herein provides a concept of change in fundamental frequency of a microelectromechanical systems (MEMS) cantilevers due to the effect of various micro and nano sized particles present in the fluid medium. The embodiments herein configured to determine presence of a given particle in minute quantities e.g. Parts per billion (ppb) quantities of corrosion inhibitor micelles in the fluid medium. The cantilever beam machined using the MEMS technology is further coated with a polymer which offers selective adsorption of the micelles present in the fluid. These then alter resonance or the Eigen frequency of a resonator and offer an acoustic anomaly or signature in the frequency spectrum. This is then detected and correlated with the presence of the chosen particles and further quantified.

Referring now to the drawings, and more particularly to FIGS. 1 through 5B, where similar reference characters denote corresponding features consistently throughout the figures, there are shown preferred embodiments and these embodiments are described in the context of the following exemplary system and/or method.

Figure 1:
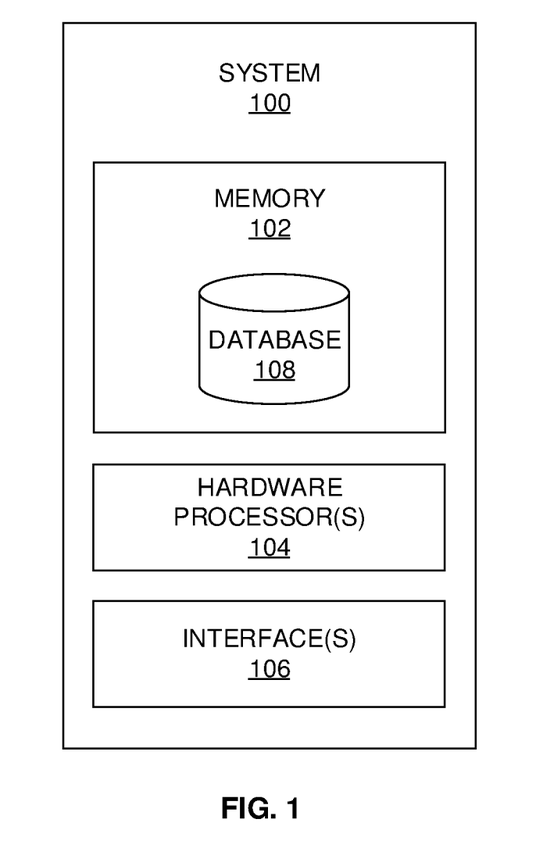
FIG. 1 illustrates a system for detection and measurement of concentration of micro and nano particles in flowing fluid environment, according to embodiments of the present disclosure.

FIG. 1 illustrates a system 100 for detection and measurement of concentration of micro and nano particles in flowing fluid environment, according to embodiments of the present disclosure. In an embodiment, the system 100 includes one or more processors 104, communication interface device(s) or input/output (I/O) interface(s) 106, and one or more data storage devices or memory 102 operatively coupled to the one or more processors 104. In another embodiment, the system 100 includes a signal generator, a signal receiver, a signal conditioning and processing, a data analysis and processor, an artificial intelligence (AI) based data model (not shown in drawings). The memory 102 comprises a database 108. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The database 108 may store information but are not limited to, a plurality of parameters obtained from one or more sensors, wherein the parameters are specific to an entity (e.g., a transducer array, a conduit, a pipeline, an enclosure and the like). Parameters may comprise sensor data captured through the sensors connected to the transducer array and the pipeline. Further, the database 108 stores information pertaining to inputs fed to the system 100 and/or outputs generated by the system (e.g., at each stage), specific to the methodology described herein. More specifically, the database 108 stores information being processed at each step of the proposed methodology.

Figure 2:
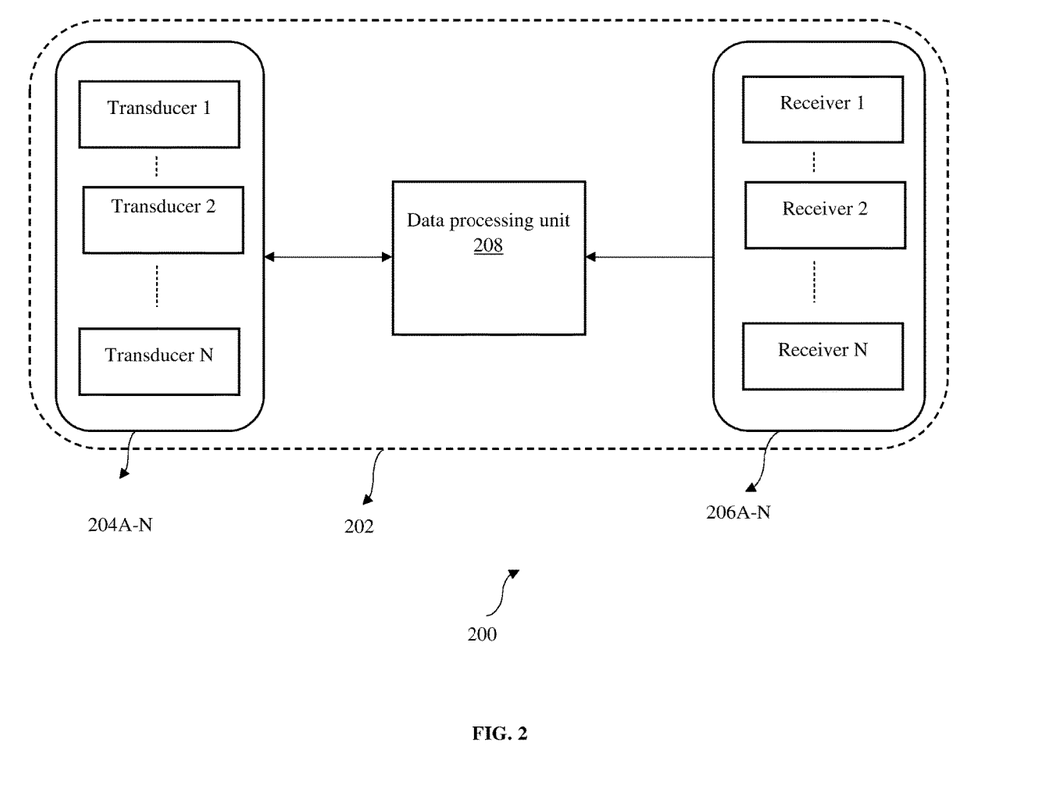
FIG. 2 is a functional block diagram of exemplary acoustic based sensing system for detection and measurement of concentration of micro and nano particles in flowing fluid environment, according to embodiments of the present disclosure.

FIG. 2 is a functional block diagram of exemplary acoustic based sensing system 200 for detection and measurement of concentration of micro and nano particles in flowing fluid environment, according to embodiments of the present disclosure. In an embodiment, the acoustic based sensing system 200 is configured to detect and measure concentration of micro or nano particles or combination thereof. In an embodiment, the fluid environment can be stationary or flowing environment or combination thereof. The acoustic based sensing system 200 comprises a plurality of acoustic transducers, and a data processing unit (208). The plurality of acoustic transducers i.e., an acoustic transmitting and receiving array (204A-N and 206A-N respectively) comprises a plurality of transmitter and a plurality of receiver which are mounted along with flow within a conduit (202). In an embodiment, the conduit 202 corresponds to a pipe or an enclosure. In an embodiment, the conduit (202) through which the fluid (e.g., oil, gas, chemicals etc.) flowing thereby creates a fluid environment. The method enables detecting variations in a signal thereby detection and possible measurement of particles.

An insonifying signal at a selected sweep of high frequencies at selected location and measuring response along length of the pipe or the enclosure (202). The transmitter is coated with a polymer which is configured to allow desired nano and micro particles to adsorb to their receiving surfaces thereby changing resonance of the plurality of transducers and correspondingly affect the signal. The correlation of the transmitted signal and the received signal which reveal presence of nano/micro particles in the fluid. In an embodiment, a calibration with known quantities of particles reveal the concentration of these particles and enable the system to measure them in-situ.

In an embodiment, the acoustic transmitter (Tx) performs a scan (e.g., a progressive scan of frequencies) of a conduit/similar environment (from a given location) by transmitting signals. A plurality of reflected signals are received from the objects within the conduit. In an embodiment, features are extracted from the plurality of reflected signals (e.g., the digital signals or backscattered signals) in time and frequency domain. In an embodiment, an alert is notified when a presence is detected by insonifying the conduit over a broadband scan of frequencies. In an embodiment, fusing are performed at features level and at a score level. The features that are extracted in the time domain include but not limited to, an amplitude (or energy profiles) or a duration per each insonified frequency, in conjunction with features extracted in frequency domain such as power spectral density and frequency content, enable to find the presence for more accurate detection, including estimation of the time of occurrence of an presence. In an embodiment, one or more energy profiles are extracted from the time domain and the frequency domain features are augmented to detect the presence better than using only spectral information. This enables to estimate the time of occurrence of a variation due to presence of nano micro particles.

In an embodiment, the processor implements or executes an machine learning technique by adaptive weighting techniques for feature extraction from the plurality of reflected signals in the time and frequency domain and to detect the presence occurrence. In an embodiment, the acoustic Tx-Rx system is trained in both an online mode and an offline mode by using an artificial neural network and other machine learning techniques. This enables the acoustic Tx-Rx system to learn from the training data, and identifying anomalies detection pattern. The acoustic Tx and the acoustic Rx system is trained in the time and frequency domains.

In an exemplary embodiment, the method of detecting and estimating concentration of micro and nano particles is illustrated in an oil and gas flowing at a conduit. The step involved are illustrated as follows: In an embodiment, the fluid (e.g., de-ionized water) is passed through the conduit to obtain at least one of a conduit size, or other artefacts data from the existing standard measurement to serve as a ground truth and annotate the data-set. The acoustic Tx is deployed at a first location with a prior map of the conduit. The conduit is insonified at one or more predetermined frequencies from the first location and a plurality of reflected signals are received. The transmitter is configured to transmit signals at one or more predetermined range of frequencies. The received signals (e.g., the reflected signals or backscattered signals) are recorded and features pertinent to the conduit are extracted from the reflected signals or backscattered signals and the first location is marked. Subsequently, a second location is identified with respect to the first location and the conduit is insonified at the predetermined frequencies from the second location (e.g., repeating the step). In an embodiment, the step of insonifying the conduit is repeated until the entire conduit is covered and data is collected. In an embodiment, the step of insonifying the conduit is based on at least one of the conduit size, or other artefacts, etc. Accordingly, the step of insonifying the conduit from the second location may not be required if the conduit is small enough to be scanned in a single attempt. For example, when a conduit is small enough, the conduit is insonified by a single scan of frequency.

The plurality of features and minimum number of recordings are established, based on which an acoustic map of the conduit is generated. The acoustic Tx Rx system is trained for various normal situations and the threshold for detection is set (or configured). Based on the training data available for a given conduit (or one or more conduits), the acoustic Tx Rx system determines the number of frequency scans (e.g., progressive scans) required for a conduit. For example, for a given conduit (10 m long), the acoustic Tx may have completed scanning in 2 attempts at a first time duration T1, with a predetermined band of frequencies x MHz set. The scanned information is stored in a memory, which is utilized by the acoustic Tx at a later stage for presence detection at a second time duration T2 (where T2=T1+x), where x comprises real numbers. These features are extracted and recorded in a library and archived for training the system. The acoustic Tx performs the scanning in 2 attempts by setting the frequency band to x MHz and thereby reduces the training time for training the acoustic Tx, since the training data is already available in the memory (or database). The acoustic Tx enables detecting variations in a conduit by removing/including objects within the conduit for surveillance and detection purposes and other changes in flow.

The acoustic Tx and Rx system may be mounted on any object for detection. The acoustic Tx include one or more transmitters and receivers to insonify the conduit at a selected sweep of frequencies at selected locations and for measuring the response. This measured response is then analyzed for variations from the original signal to determine the existence of nano micro particles. Since, the time domain data consists of information in terms of duration and amplitude and energy and spectral data contains energy spread over frequencies, the fusion offers a much larger data-set which is used for training and subsequently detection. The acoustic Tx enables interaction between these acoustic backscattered/reflected signals being pre-processed by adaptive weighting which include one or more features that are the key to rapid and error proof presence detection.

In an embodiment, a high frequency acoustic transmitter and receiver array pair is employed to continuously transmit and receive a frequency sweep waveform whilst installed in the fluid environment. The transmitted Impulse Response (IR) is achieved by insonifying the enclosure/pipe (202) and correlating the same with the received signal at various locations within the pipe (202). In an embodiment, the transmitted Impulse Response (IR) may vary as a function of the dimension of the pipe or the enclosure (202) along with the particle concentration in the moving fluid.

In an embodiment, a fluid flowing pipe or enclosure (202) is insonified by a sweep of frequencies at selected locations along the length by piezoelectric transducers. The transmitting area of these transducers is coated with polymers which have property to selectively adsorb the intended nano/micro particles. Acoustic Time series data is recorded by the acoustic receiver array at the given locations. In an embodiment, continuous transmission and reception is active at periodic intervals and correlation of these signals allows for detection in change of fluid medium with particles concentration change.

For example, acoustic techniques such as time reversal mirror etc. can further be employed to improve gain and Signal to noise ratio (SNR). In an embodiment, the features are extracted and recorded in a library and archived for training the system with known quantity of particle concentration. In an embodiment, machine learning techniques applied to detect the variation in signals and thereby the presence of these desired nano/micro particles and quantify them.

Figure 3:
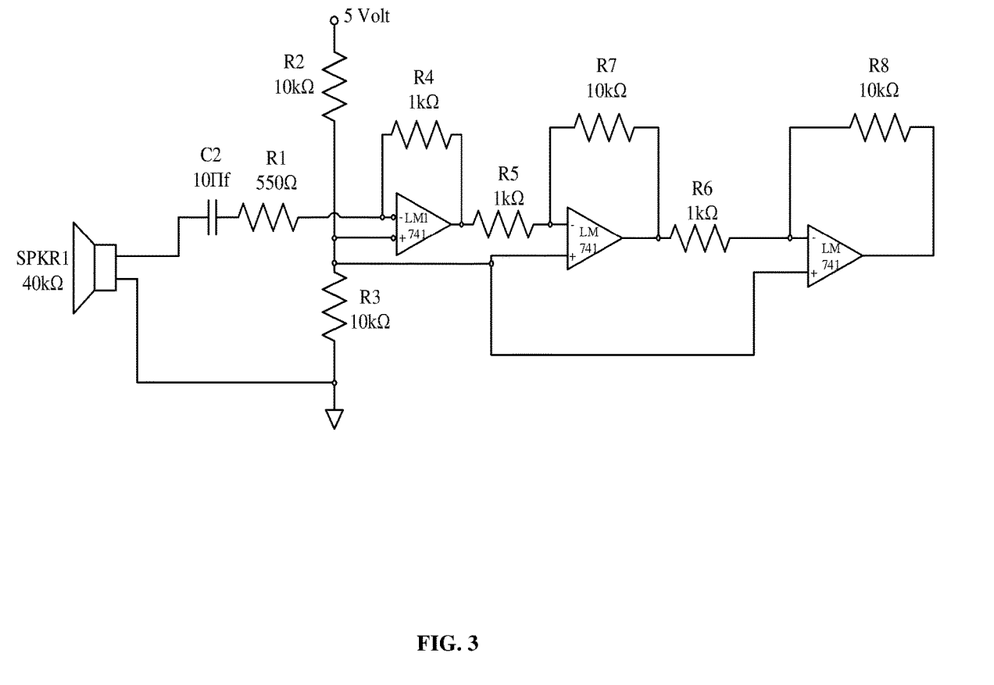
FIG. 3 illustrates an exemplary transmitter and receiver system, according to embodiments of the present disclosure.

FIG. 3 illustrates an exemplary transmitter and receiver system, according to embodiments of the present disclosure. The acoustic transducer array include one ultrasonic transmitter module (e.g., HC-SR04) and an ultrasonic receivers of 2-4 MHz frequency mounted on a mobile robot. In an embodiment, spacing between the transmitter array and the receiver array are designed. For example, an operating frequency is 2-4 MHz and speed of sound in fluids is approximately 1500 m/sec, distance between two consecutive receivers can be of the order of 2 m. In an embodiment, electronics behind each receiver include a 1 MHz High Pass Filter (HPF) and a two-stage OPAMP amplifier as referenced in FIG. 3. The overall gain of the amplifier is 200× (approx.).

The acoustic Tx-Rx system include at least one of a processor, a multi-channel synchronous analog to digital converter (DAC), a time gating unit, an amplification unit, transmitters, receivers, a hydrophone pre-amplification unit, an analog antialiasing filter, and a multi-channel synchronous analog to digital converter (ADC). The processor is configured to process one or more acoustic signals to be transmitted. The multi-channel synchronous DAC is configured to receive the acoustic signals and converts the acoustic input signals to analog signals. The time gating unit triggers a switch to transmit output signals (e.g., the analog signals) after recording input signals. The amplification unit amplifies the analog signals to obtain amplified signals and are transmitted to the transmitters (Tx). In an embodiment, the amplification unit is a power amplifier. The transmitter is configured to transmit the amplified signals for insonifying a given location (e.g., a pipe). Further, the transmitter transmit the amplified signals at a predetermined range of frequencies (e.g., ≥20 Mega Hertz (MHz)).

In an embodiment, the receivers are configured to receive a plurality of reflected signals (e.g., reflected signal acoustic time series) from objects in the given location (e.g., the pipe). The objects include but not limited to the nano and the micro particles. In an embodiment, the receivers array include a hydrophone (Rx) receiver array. The hydrophone pre-amplification unit is configured to receive the plurality of reflected signals from the receivers and amplifies the reflected signals to obtain amplified signals. In an embodiment, the hydrophone pre-amplification unit is a low noise device and boosts the signal strength thereby improving the signal-to-noise ratio (SNR). For example, the hydrophone pre-amplification unit is a signal pre-amplifier. The analog antialiasing filter restricts the bandwidth of the amplified signals to approximately to a sampling rate over a band of interest. The multi-channel synchronous analog to digital converter (ADC) converts the amplified signals to digital signals. The processor is configured to perform a comparison of the digital signals (e.g., the reflected signals) and the transmitted signals. Further, the processor measures a response with respect to the transmitted signals based on the comparison. The processor analyzes the response for variations from the transmitted signals to determine an existence of a presence such as but not limited to an addition, or removal of objects or intruders. The variation may also include changes in conduit artefacts. In an embodiment, the acoustic Tx employs a phased Tx beam forming technique(s) on the reflected signals to extract features.

Figure 4A:
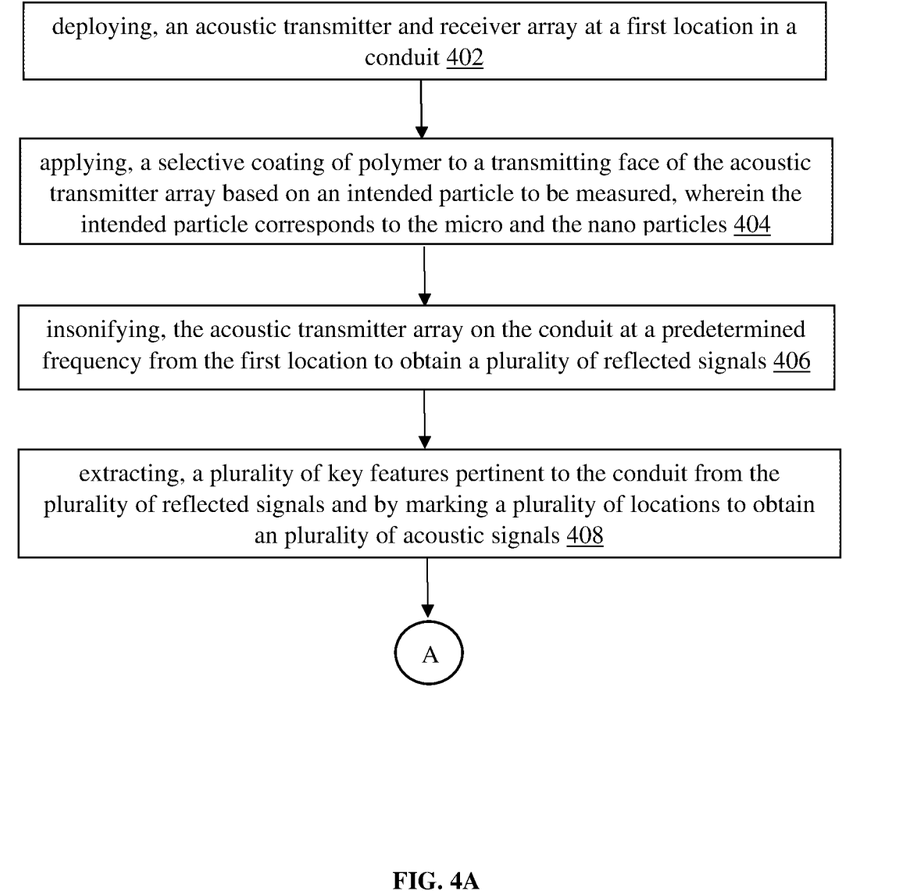
FIGS. 4A and 4B is an exemplary flow diagrams illustrating a method of detecting and measuring concentration of micro and nano particles in flowing fluid environment, according to embodiments of the present disclosure.
Figure 4B:
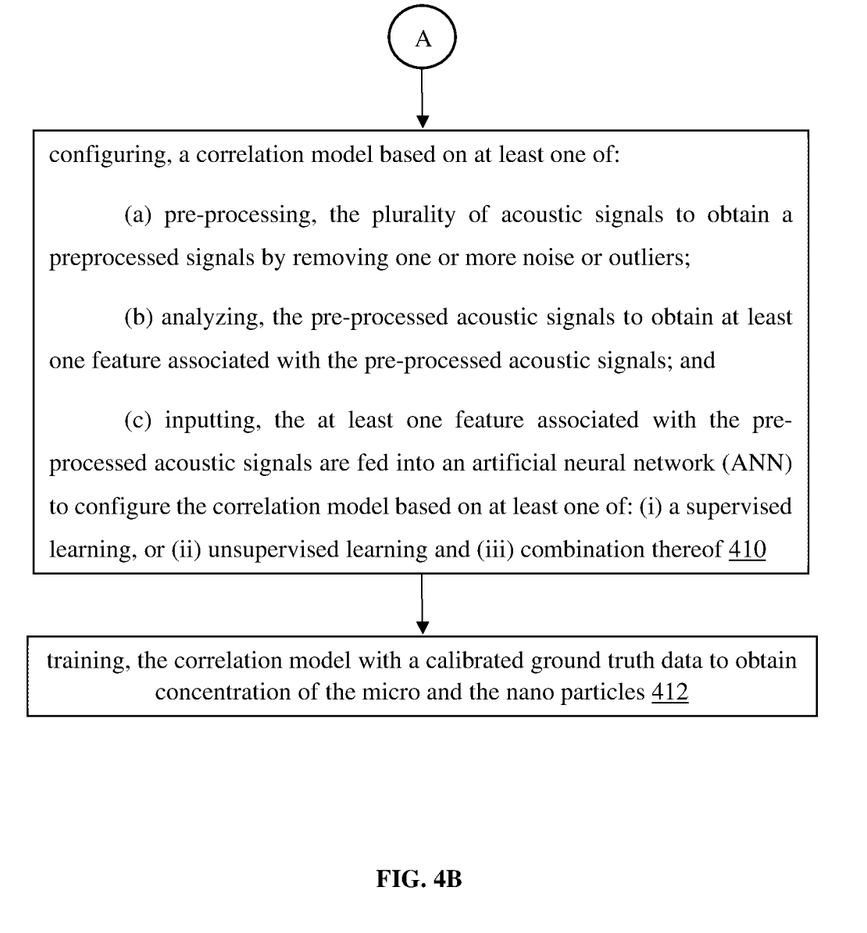

FIGS. 4A and 4B is an exemplary flow diagrams illustrating a method of detecting and measuring concentration of the micro and the nano particles in flowing fluid environment, according to embodiments of the present disclosure. In an embodiment, the system 100 comprises one or more data storage devices or the memory 102 operatively coupled to the one or more hardware processors 104 and is configured to store instructions for execution of steps of the method by the one or more processors 104. The flow diagram depicted is better understood by way of following explanation/description. The steps of the method of the present disclosure will now be explained with reference to the components of the system as depicted in FIGS. 1 and 2.

At step 402, the acoustic transmitting and receiving array (204A-N and 206A-N respectively) is deployed at a random location (e.g., a first location) with a prior map in conduit 202. In step 404, selective polymers is coated to transmitting face of acoustic transmitter array based on an intended particle to be measured. In an embodiment, the intended particle corresponds to the micro and the nano particles. In step 406, the acoustic transmitter array on the conduit is insonified at a predetermined frequency from the first location to obtain a plurality of reflected signals. In step 408, a plurality of key features pertinent to the conduit is extracted from the plurality of reflected signals and by marking a plurality of locations to obtain a plurality of acoustic signals. In an embodiment, a specified location is recorded for the receiver array with respect to the earlier location. Further, the one or more specified locations are recorded until the entire pipeline or at least a selected location is covered and data is collected.

In step 410, an artificial intelligence (AI) based correlation model is configured. In an embodiment, the steps involved in configuring the correlation model are as follows: The plurality of acoustic signals is preprocessed to obtain a preprocessed signals by removing one or more noise or outliers. In an embodiment, a pre-processing algorithm is applied on the plurality of acoustic signals to remove any spurious noise/outliers present due to flow changes, external noise, flow system noise etc. The pre-processed acoustic signals is analyzed to obtain at least one feature associated with the pre-processed acoustic signals. In an embodiment, one or more machine learning algorithms is deployed to automatically detect and flag anomalies and outliers. In an embodiment, the at least one feature associated with the pre-processed acoustic signals to distinguish effect on the plurality of reflected signals due to effect of at least one particle adsorbed on the face of the transmitter array. In an embodiment, the at least one key features are extracted from at least one of: (i) a time-domain, (ii) a frequency domain, (iii) wavelets, (iv) recurrence plots, and (v) optical features from images etc. In an embodiment, the at least one feature associated with the pre-processed acoustic signals are fed as input into an artificial neural network (ANN) to configure the correlation model. In an embodiment, the artificial neural network (ANN) based machine learning algorithm can be supervised or unsupervised to develop a customized model for detection of presence and concentration of the selected micro and nano particles.

In an embodiment, in a supervised learning, the extracted features are fed along with the labels from the ground truth device and build a model. In an embodiment, the supervised learning corresponds to at least one of a classification and regression tree (CART), a support vector machine (SVM). In another embodiment, in an unsupervised learning, extracted features are fed to form different clusters based on variance and discriminant information present in the data. The unsupervised training (to handle complex data and modelling the non-stationary data) can be carried out using clustering algorithms such as k-means, mixture models, Hidden Markov Models (HMMs). In an embodiment, an acoustic map of the conduit is determined based on the plurality of key features and a minimum number of recordings are established. In an embodiment, trained with algorithm for various known concentrations of nano and micro particles and calibrated with ground truth data. In an embodiment, the location of the transmitter array and receiver array and the correlation model are finalized for detecting the particular micro and nano particles in the fluid environment.

Figure 5A:
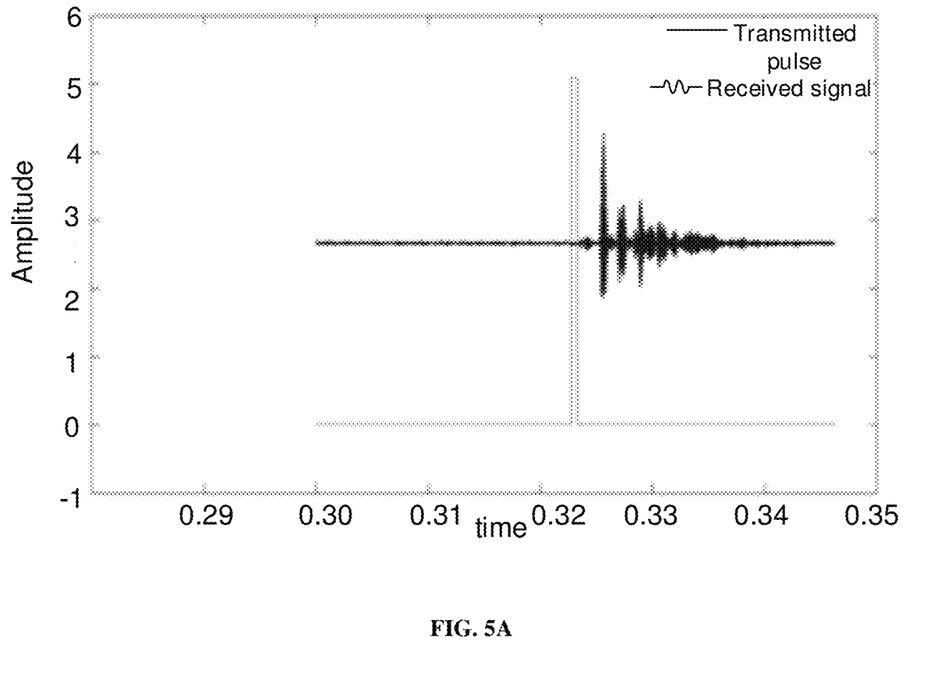
FIG. 5A is an exemplary graphical representation of a time series data illustrating of absence of particles in the fluid environment, according to embodiments of the present disclosure.

FIG. 5A is an exemplary graphical representation of a time series data illustrating of absence of particles in the fluid environment, according to embodiments of the present disclosure.

Figure 5B:
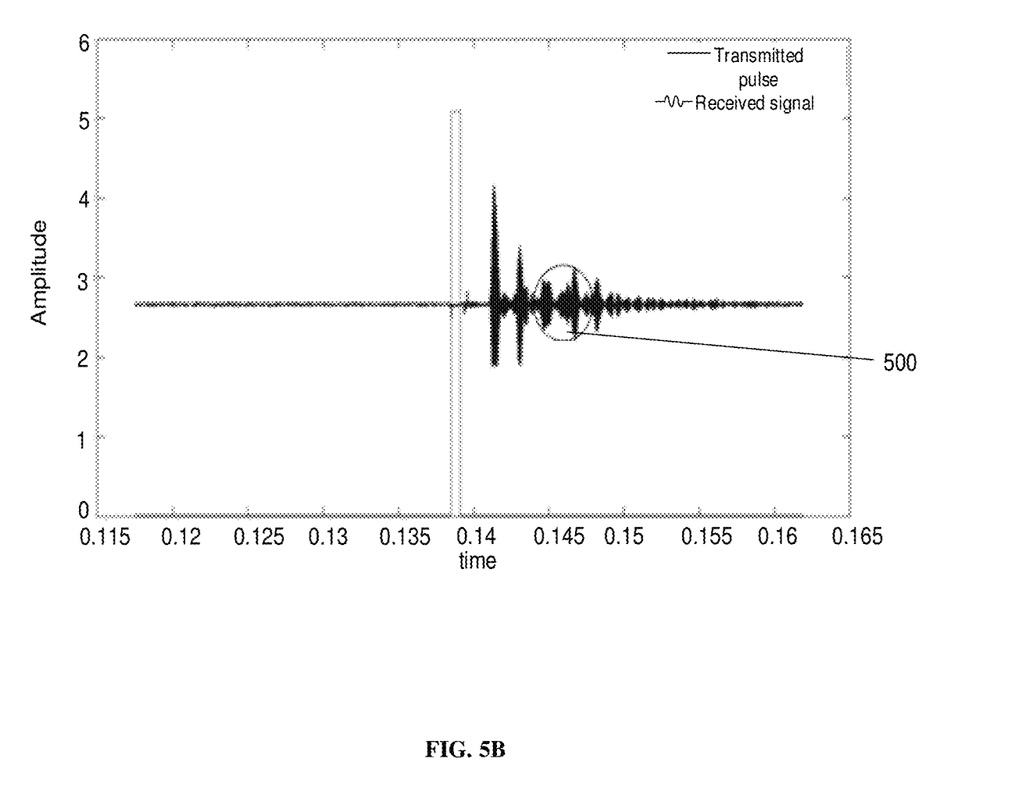
FIG. 5B is an exemplary graphical representation of a time series data illustrating of presence of micro and nano particles is detected in the fluid environment, according to embodiments of the present disclosure.

FIG. 5B is an exemplary graphical representation of a time series data illustrating of presence of micro and nano particles is detected in the fluid environment, according to embodiments of the present disclosure.

The embodiments of present disclosure herein addresses unresolved business problems as mentioned below: (i) In-situ detection and measurement of nano and micro particles in a flowing or stationary fluid; (ii) direct detection and measurement, that is achieved through high frequency sweep of acoustic sensing which can be deployed in for a flowing liquid (e.g. inside pipelines) and harsh environments; (iii) In expensive and real-time measurements can be made for control purposes; (iv) Acoustic systems are less computationally expensive as compared to imaging techniques.

The embodiments of present disclosure utilizes resonance property of the transducer and measures standing wave pattern in a static and flowing fluid to not only detect the presence of the nano and micro particles but also to quantitatively estimate. The principle based on longitudinal standing waves in a conduit or pipe to continuously monitor and estimate the presence of nano and micro particles. The embodiment, thus provides an approach for detection of nano and micro particles by progressively scanning at a given number of locations through the acoustic array. This approach does not require installation expensive optical or spectrographic equipment. The embodiments herein further provides a method which works in dark and severe environment where conventional optic or spectrometry based systems fail. The embodiments of present disclosure works for various ranges of environments and an optimal number of scans are decided based on complexity and dimensions of pipeline or chamber. The processing complexity is significantly reduced as compared to the optic or spectrometry based systems by identifying key features in received acoustic signals.

The technical advantages of the present approach are as listed below: (i) development of an acoustic model and polymer combination specific to the selected system over range of frequencies at multiple locations for detecting the presence of desired particles; (ii) Identifying key features in the acoustic signal to enable rapid assessment of presence of desired particles and associated concentration; and (iii) Real-time In-situ installation and inexpensive apparatus for rapid measurements in various environments. Further, combining acoustic techniques such as TRM for improving gain and SNR is not obvious. The features and polymer adsorption in the proposed approach are over a range of frequencies.

The embodiments of the present approach is relatively compact and requires inexpensive piezoelectric transducer and receiver pairs and can be deployed without any difficulty. The embodiments of the present approach is simple to calibrate given ground truth data and requires no additional intervention in terms of location of data collection as per the dimensions and complexity of the pipeline. The embodiments of the present approach is based on ultrasonic/high frequency acoustics hence low power consumption and complexity of processing. The embodiments of the present approach detects presence of the desired nano/micro particles but does not alter the flow or conditions of the existing system.

The embodiments of the present disclosure may be extended to employ conjugates to determine presence of multiple particles and discrimination of multiple types co-existing within the fluid environment.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method of detecting and estimating concentration of micro particles and nano particles in a fluid environment, the method comprising:
   deploying an acoustic transmitter array and an acoustic receiver array at a first location in a conduit;
   applying a selective coating of polymer to a transmitting face of the acoustic transmitter array based on an intended particle to be measured, wherein the intended particle corresponds to the micro particles and the nano particles, wherein the application of selective coating of polymer enables adsorption of desired micro particles and nano particles and changes resonance of a plurality of transducers and wherein correlation of a transmitted signal and a received signal reveals presence of the micro particles and the nano particles in the fluid environment, wherein the fluid environment is at least one of a stationary environment and a flowing environment;

calibrating known quantities of the micro particles and the nano particles, wherein the calibration reveals concentration of the micro particles and the nano particles and enables measurement of the micro particles and the nano particles in-situ;

insonifying the acoustic transmitter array on the conduit at a predetermined frequency from the first location to obtain a plurality of reflected signals, wherein an alert is notified when presence of the micro particles and the nano particles are detected;

extracting a plurality of features pertinent to the conduit from the plurality of reflected signals by marking a plurality of locations to obtain an plurality of acoustic signals, wherein the extraction is based on implementation of a machine learning technique by adaptive weighing techniques;

training an acoustic Tx-Rx system in an online mode and an offline mode by using an artificial neural network (ANN) and enabling the acoustic Tx-Rx system to learn from training data and identify anomalies detection pattern in the micro particles and the nano particles;

configuring an Artificial Intelligence (AI) based correlation model based on-:
(a) pre-processing the plurality of acoustic signals to obtain one or more pre-processed signals by removing noise and outliers;
(b) analyzing the one or more pre-processed acoustic signals to obtain at least one feature associated with the plurality of pre-processed acoustic signals; and
(c) inputting the at least one key feature associated with the plurality of pre-processed acoustic signals into the ANN to configure the AI based correlation model based on: (i) a supervised learning, or (ii) unsupervised learning and (iii) a combination thereof;

developing a customized model for detection of presence and concentration of the micro particles and the nano particles;
and
training the correlation model with calibrated data to obtain concentration of the micro particles and the nano particles, wherein the fluid from the fluid environment is passed through the conduit to obtain at least one of a conduit size, and artefacts data from a standard measurement.

2. The process implemented method of claim 1, further comprising determining an acoustic map of the conduit based on the plurality of features.

3. The processor implemented method of claim 1, wherein the at least one feature associated with the plurality of pre-processed acoustic signals distinguishes effects on the plurality of reflected signals due to effects of at least one particle adsorbed on the face of the transmitter array.

4. The processor implemented method of claim 3, wherein the at least one feature is extracted from at least one of: (i) a time-domain, (ii) a frequency domain, and (iii) wavelets.

5. The processor implemented method of claim 1, wherein the supervised learning corresponds to a classification and regression tree (CART), and a support vector machine (SVM).

6. The processor implemented method of claim 1, wherein the unsupervised learning corresponds to k-means, mixture models, and Hidden Markov Models (HMMs).

7. A system to detect concentration of micro particles and nano particles in a fluid environment, the system comprising:

a conduit;
an acoustic transmitter array and an acoustic receiver array deployed at a first location in the conduit;
wherein a transmitting face of the acoustic transmitter array is applied with a selective coating of polymer based on an intended particle to be measured, wherein the intended particle corresponds to the micro particles and the nano particles, wherein the application of selective coating of polymer enables adsorption of desired micro particles and nano particles and changes resonance of a plurality of transducers and wherein correlation of a transmitted signal and a received signal reveals presence of the micro particles and the nano particles in a fluid of fluid environment, wherein the fluid environment is at least one a stationary environment and a flowing environment;
wherein the acoustic transmitter array on the conduit is insonified at a predetermined frequency from the first location to obtain a plurality of reflected signals, wherein an alert is notified when presence of the micro particles and the nano particles are detected;
one or more hardware processors coupled to a memory via one or more communication interfaces, wherein the one or more hardware processors are configured by the instructions to:
calibrate known quantities of the micro particles and the nano particles for revealing concentration of the micro particles and the nano particles and measuring the concentration of the micro particles and the nano particles in-situ;
extract a plurality of key features pertinent to the conduit from the plurality of reflected signals by marking a plurality of locations to obtain an plurality of acoustic signals, wherein the extraction is based on implementation of a machine learning technique by adaptive weighing techniques and wherein the plurality of key features are associated with rapid and error proof presence detection of the micro particles and the nano particles;
train an acoustic Tx-Rx system in an online mode and an offline mode by using an artificial neural network (ANN) and enabling the acoustic Tx-Rx system to learn from training data and identify anomalies detection pattern in the micro particles and the nano particles;
configure an Artificial Intelligence (AI) based correlation model based on:
(a) pre-processing the plurality of acoustic signals to obtain one or more pre-processed signals by removing noise and outliers;
(b) analyzing the one or more pre-processed acoustic signals to obtain at least one feature associated with the plurality of pre-processed acoustic signals; and
(c) inputting the at least one feature associated with the plurality of pre-processed acoustic signals into the ANN to configure the AI based correlation model based on at least one of: (i) a supervised learning, or (ii) unsupervised learning and (iii) combination thereof;
develop a customized model for detection of presence and concentration of the micro particles and the nano particles; and
train the correlation model with calibrated data to obtain a concentration of the micro particles and the nano particles, wherein the fluid from the fluid environment is passed through the conduit to obtain at least one of a conduit size, and artefacts data from a standard measurement.

8. The system of claim 7, wherein the one or more processors are further configured by the instructions to determine an acoustic map of the conduit based on the plurality of features.

9. The system of claim 7, wherein the at least one feature associated with the plurality of pre-processed acoustic signals distinguishes effects on the plurality of reflected signals due to effects of at least one particle adsorbed on the face of the transmitter array.

10. The system of claim 9, wherein the at least one feature is extracted from at least one of: (i) a time-domain, (ii) a frequency domain, and (iii) wavelets.

11. The system of claim 7, wherein the supervised learning corresponds to a classification and regression tree (CART), and a support vector machine (SVM).

12. The system of claim 7, wherein the unsupervised learning corresponds to k-means, mixture models, and Hidden Markov Models (HMMs).

* * * * *